US006985898B1

(12) United States Patent
Ripley et al.

(10) Patent No.: US 6,985,898 B1
(45) Date of Patent: *Jan. 10, 2006

(54) SYSTEM AND METHOD FOR VISUALLY REPRESENTING A HIERARCHICAL DATABASE OBJECTS AND THEIR SIMILARITY RELATIONSHIPS TO OTHER OBJECTS IN THE DATABASE

(75) Inventors: John R. Ripley, Round Rock, TX (US); Steve C. Wotring, Austin, TX (US); Gordon C. Hicks, Round Rock, TX (US)

(73) Assignee: Infoglide Corporation, Austin, TX (US)

( * ) Notice: Subject to any disclaimer, the term of this patent is extended or adjusted under 35 U.S.C. 154(b) by 908 days.

This patent is subject to a terminal disclaimer.

(21) Appl. No.: 09/677,476

(22) Filed: Oct. 2, 2000

Related U.S. Application Data

(60) Provisional application No. 60/157,476, filed on Oct. 1, 1999.

(51) Int. Cl.
G06F 17/30 (2006.01)
(52) U.S. Cl. .............................. 707/5; 707/10; 707/102; 707/103 R; 707/104.1; 709/203; 715/516
(58) Field of Classification Search ................ 707/10, 707/104, 3, 4, 5, 6, 102, 103 R, 104.1; 702/22, 702/27; 709/203; 345/355, 420; 715/526, 715/738, 700, 850, 516

See application file for complete search history.

(56) References Cited

U.S. PATENT DOCUMENTS

| 5,579,471 | A | * | 11/1996 | Barber et al. ............... 715/700 |
| 5,893,095 | A | * | 4/1999 | Jain et al. .................... 707/6 |
| 5,915,250 | A | * | 6/1999 | Jain et al. .................... 707/100 |
| 6,038,561 | A | * | 3/2000 | Snyder et al. .................. 707/6 |
| 6,041,323 | A | * | 3/2000 | Kubota ........................... 707/5 |
| 6,121,969 | A | * | 9/2000 | Jain et al. .................... 715/850 |
| 6,182,069 | B1 | * | 1/2001 | Niblack et al. ................. 707/6 |
| 6,396,492 | B1 | * | 5/2002 | Frisken et al. ............... 345/420 |
| 6,446,065 | B1 | * | 9/2002 | Nishioka et al. ............... 707/5 |
| 6,496,832 | B2 | * | 12/2002 | Chi et al. .................... 707/102 |
| 6,594,673 | B1 | * | 7/2003 | Smith et al. ............. 707/104.1 |
| 6,598,054 | B2 | * | 7/2003 | Schuetze et al. ........ 707/103 R |
| 6,618,727 | B1 | * | 9/2003 | Wheeler et al. .............. 707/10 |

(Continued)

OTHER PUBLICATIONS

Petrakis, Euripides G. M. et al., "Similarity Searching in Medical Image Databases", IEEE Transaction on Knowledge and Data Engineering, vol. 9, No. 3, May/Jun. 1997, pp. 435-447.*

*Primary Examiner*—Shahid Alam
(74) *Attorney, Agent, or Firm*—Taylor Russell & Russell, P.C.

(57) ABSTRACT

The present invention comprises a computer-implemented visualization model of similarity relationships between documents. It comprises performing a similarity search based on at least one attribute of a reference document to find at least one target document with similar attributes; creating a visual representation of the reference database document and the at least one target document; creating a visual representation of the similarities between the reference document and the at least one target document; and displaying the visual representations of the database documents and their similarities on a graphical user interface. The target documents that are similarity searched may reside in a plurality of databases. The similarity search returns a result set of target documents that are used by the visualization model to create the visual representation of the documents and the similarities between the documents.

25 Claims, 13 Drawing Sheets

U.S. PATENT DOCUMENTS 6,691,109 B2 * 2/2004 Bjornson et al. ............... 707/4
6,745,183 B2 * 6/2004 Nishioka et al. ............... 707/5
6,745,204 B1 * 6/2004 Hogue et al. ............ 707/104.1
2002/0178153 A1 * 11/2002 Nishioka et al. ............... 707/3

* cited by examiner

| | | |
|---|---|---|
| ☐ DB_3<br>├─ Primary Key<br>☐ Name - Standard<br>│  ├─ *Honorarium*<br>│  ├─ *First*<br>│  ├─ *Middle*<br>│  ├─ *Last*<br>│  └─ *Suffix*<br>├─ Address - Stand.<br>└─ Code 2 | ☐ Display Settings<br>  Color (Background)<br>  Color (Text)<br>  Editor<br>  Visible<br>☐ General Settings<br>  Data type<br>  Description<br>  Field Name<br>  Key<br>  Read Only<br>  Required<br>  Summary<br>☐ QuickLink Settings<br>  Allow QuickLinks<br>  Context Mapping<br>  Threshold<br>☐ SSE Settings<br>  Context Mapping<br>  Default Measure<br>  Default Weight<br>  Tokenizer | <br>White<br>Black<br>Text<br>Visible<br><br>Text<br>First<br>FIRST<br>☐<br>☐<br>☐<br>☐<br><br>☐<br>[...]<br>99%<br><br>[ ]<br>Name<br>30% |

| Databases | Order | Question | Data Type |
|---|---|---|---|
| DB_1<br>DB_2<br>DB_3 | ☐1<br>☐2<br>☐3<br>☐4<br>☐5<br>☐6<br>☐7<br>☐8<br>☐9<br>☐10 | DB_3\Name-Standard\Honorarium<br>DB_3\Name-Standard\First<br>DB_3\Name-Standard\Middle<br>DB_3\Name-Standard\Last<br>DB_3\Name-Standard\Suffix<br>DB_3\Address-Standard\Street<br>DB_3\Address-Standard\Apt<br>DB_3\Address-Standard\City<br>DB_3\Address-Standard\County<br>DB_3\Address-Standard\Country | Text<br>Text<br>Text<br>Text<br>Text<br>Text<br>Text<br>Text<br>Text<br>Text |

*FIG. 6*

| 1203598800 |
|---|
| Calvin |
| A |
| Arroyo |
| 43078 kennedy dr. Vicksburg Ny 89001 |

*FIG. 7*

| Databases | Order | Question | Data Type |
|---|---|---|---|
| DB_3 | ☐ 1<br>☐ 2 | DB_3\Name-Standard\First<br>DB_3\Name-Standard\Last | Text<br>Text |

SYSTEM AND METHOD FOR VISUALLY REPRESENTING A HIERARCHICAL DATABASE OBJECTS AND THEIR SIMILARITY RELATIONSHIPS TO OTHER OBJECTS IN THE DATABASE

CROSS-REFERENCE TO RELATED APPLICATIONS

This application claims the benefit of U.S. Provisional Application No. 60/157,476, filed Oct. 1, 1999.

FIELD OF THE INVENTION

The invention relates generally to database visualization, the visual representation of a database. In particular, this invention relates to the field of visually representing the contents of a hierarchical database and its interrelationships. The invention may be used to visually represent any type of hierarchical database but is particularly useful in visually representing the results of searches, particularly similarity type searches, performed on hierarchical databases.

BACKGROUND OF THE INVENTION

With the proliferation of online commerce and automated systems, the amount of data that is being stored in databases has risen dramatically. With this steep increase in database size and transaction volumes, the ability to find information in a database without a reference has become extremely difficult. To help ameliorate these problems, database visualization has emerged. Database visualization is the process of displaying data and its interrelationships visually, rather than textually. Database visualization allows a user to peruse large amounts of data in order to unearth trends and other knowledge that might otherwise go undetected.

This application is related to U.S. patent application Ser. No. 09/401,101 entitled "System and Method for Performing Similarity Searching" by David B. Wheeler and Matthew J. Clay, filed on Sep. 22, 1999, and provisional patent application No. 60/157,477 entitled "System and Method for Transforming a Relational Database to a Hierarchical Database" by John R. Ripley and Steven C. Wotring, filed on Oct. 1, 1999. Both applications are incorporated by reference herein.

SUMMARY OF THE INVENTION

The current invention provides a system and method for visually representing hierarchical database objects and their interrelationships. The invention provides a process for visually representing hierarchical database objects contained in a hierarchical document, as well as their similarities to other database objects in the hierarchical database management system. A user has the ability to perform a quicklink search which is a similarity search on specified attributes of a database object. The quicklink search comprises a predefined query that specifies a similarity scoring method for a single data base object. The search criteria for the quicklink search may be defined, for example, when a schema for the hierarchical database is defined. The quicklink search can examine multiple documents across multiple databases. The results of the quicklink search are returned in the form of a visual representation of the relationships and similarities among applicable data, as delineated by the user in setting the quicklink search criteria. The current invention allows visual document objects that are related to hierarchical database objects to be stored and in turn used in database visualization. Visual edge objects, which represent the relationships between hierarchical database objects are generated, stored and used in the database visualization. The current invention allows for multiple visual displays to be generated for a visualization model. The present invention comprises a computer-implemented visualization model of similarity relationships between documents. It comprises performing a similarity search based on at least one attribute of a reference document to find at least one target document with similar attributes; creating a visual representation of the reference database document and the at least one target document; creating a visual representation of the similarities between the reference document and at least one target document; and displaying the visual representations of the database documents and their similarities on a graphical user interface. The target documents that are similarity searched may reside in a plurality of databases. The similarity search returns a result set of target documents that are used by the visualization model to create the visual representation of the documents and the similarities between the documents.

The present invention is a computer-implemented interactive visualization model of similarity relationships between documents. It comprises using a similarity search performed on attributes of a reference document which results in a set of 0 to n target documents with similar attributes; creating a visual representation of the reference document and each target document; creating a visual representation of similarities between the reference document and each target document; and displaying the visual representation of the reference documents and each target document and their similarities on a graphical user interface. The method further comprises allowing a user using the graphical user interface to initiate the similarity search and select the attributes of the reference document to be used in the similarity search. The method further comprises allowing a user using the graphical user interface to choose any attributes of the reference document to be used in the similarity search. Attributes of the target document may be used as a source for a new similarity search.

The present invention also comprises a computer-implemented visualization model of similarities between documents. It comprises displaying a reference hierarchical object (a reference model node); allowing a user to initiate a similarity search, based on at least one attribute of the reference hierarchical object, to find at least one target hierarchical objects (a target model node); visually representing the reference model node and at least one target model node that meets a similarity search criteria; visually representing the similarities between the reference model node and each target model node as a model edge; displaying the visual representations of the model node and model edge on a graphical user interface. The model node comprises a reference to the hierarchical object the model node represents; a reference to at least one attribute of the hierarchical object used in the similarity search if a model edge exists; and visual properties of the hierarchical document the model node represents. The visual representation of the reference model node, each target model node, and each model edge may be stored in computer memory or on disk.

The model edge comprises an identifier of the reference model node from which the visual representation of the model edge will extend and an identifier of at least one target model node to which the visual representation of the model edge will extend; and a list of the similarity search attributes used in the similarity search. The method further comprises user chosen attributes to be used in the similarity search. The present invention comprises a computer-implemented method of visualizing similarity relationships between documents. The method comprises using a reference hierarchical document; performing a similarity search based on user selected attributes of the reference hierarchical document and determining a result set of target documents comprising 0 to n hierarchical documents; converting each hierarchical document to a model node that visually represents each hierarchical document to be displayed on a graphical user interface; and using the similarity search results, creating a model edge that visually represents the similarities between the reference hierarchical document and each hierarchical document. The model edge and model node may be displayed on a graphical user interface. Each model edge indicates a degree of similarity between the reference hierarchical object and the target hierarchical object and the model edge may be displayed as a line connecting model nodes, where the model nodes are depicted as geometric shapes on the graphical user interface. The length of the line connecting the model nodes may vary as a function of the degree of similarity between the reference document and the target document referenced by the model nodes. The visual representation may be represented in many different ways including a three-dimensional representation.

The present invention comprises a computer-readable medium containing instructions implementing the above methods.

BRIEF DESCRIPTION OF DRAWINGS

FIG. 5 shows a graphical user interface for allowing a user to define linkable fields in a database schema.

FIG. 6 shows a graphical user interface for defining context mapping.

FIG. 7 shows a graphical user interface for allowing a user to specify a quick link query.

DETAILED DESCRIPTION

Figure 1:
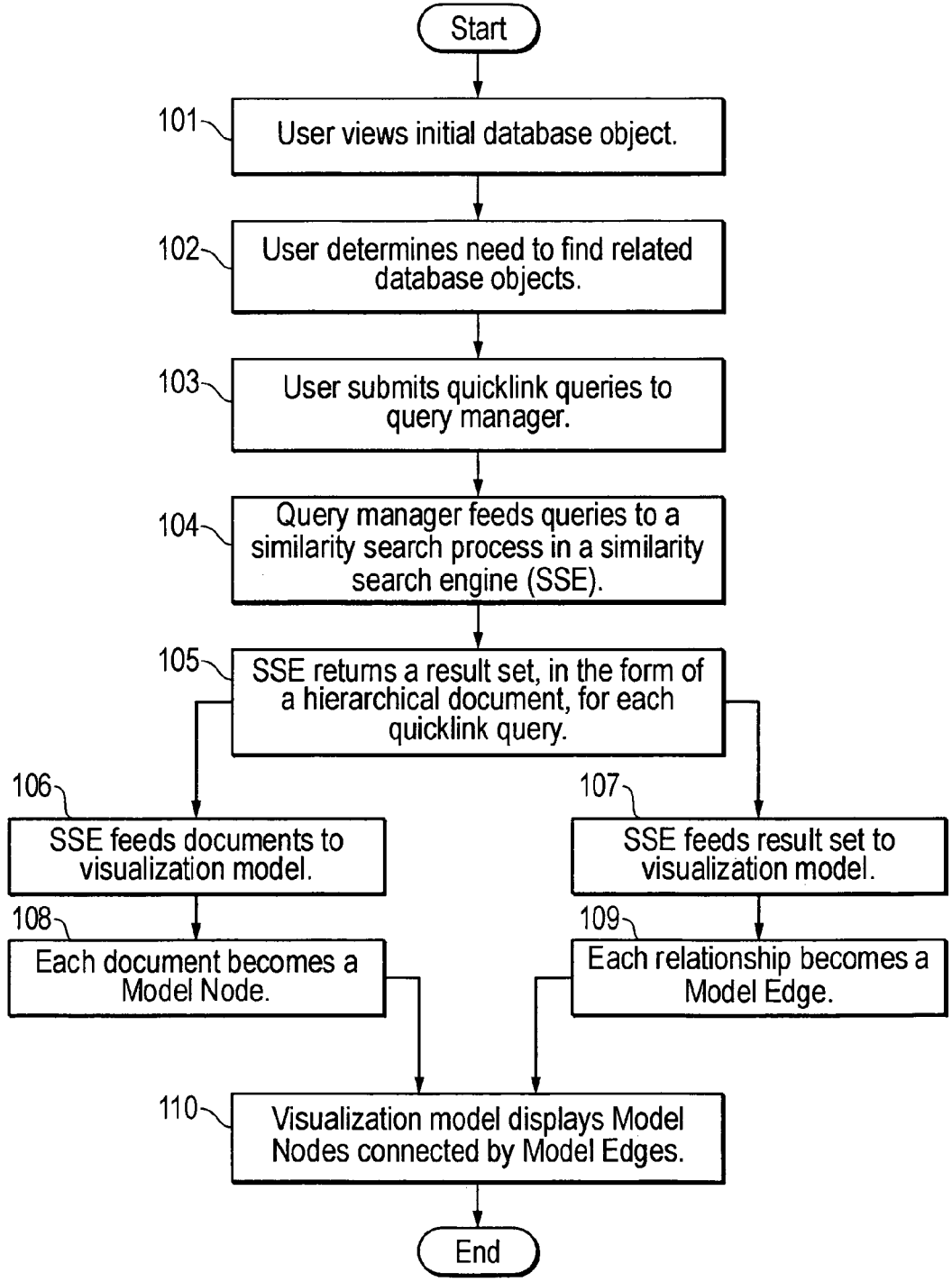
FIG. 1 is a flow diagram illustrating an overview of the steps of the method of the current invention.

FIG. 1 shows a method, according to which hierarchical documents and result sets from similarity searching are incorporated into a visual structure. In accordance with step 101, a user views an initial database object, which comprises a hierarchical document in a hierarchical database system. The user views the initial database object in the form of a Model Node, an entity that visually represents the hierarchical document and its attributes, or fields. In accordance with step 102, the user determines that there is a need to find database objects that contain similar attributes. In accordance with step 103, then, the user develops search criteria and uses it to submit quicklink queries to a query manager. A quicklink is a term relating to a connection between one document and another for a specified quicklinkable attribute. A quicklinkable field can be assigned non-context sensitive target fields that it can link to via a similarity search query. In addition, the user can specify a quicklink threshold percent value to define what percent match makes a quicklink between documents.

A separate quicklink search or query may be submitted for each attribute of the initial database object that needs to be searched. A quicklink search is a predefined query that specifies a similarity scoring method for a single database object. The quicklink search can be done on multiple documents across multiple databases. The search criteria for the quicklink search may be defined when a schema for the hierarchical database is defined. In accordance with step 104, the query manager feeds the quicklink queries to a similarity search process that returns a similarity search result. The similarity search process used in the present invention may be any type of process that results in a similarity search result being returned. While other similarity search processes may be used, the similarity search process described in U.S. patent application Ser. No. 09/401,101, filed on Sep. 22, 1999, entitled "System and Method for Performing Similarity Searching" by David B. Wheeler and Matthew J. Clay describes one such similarity search process having a similarity search engine (SSE) that may be used in the present invention.

In accordance with step 105, the similarity search process or the similarity search engine (SSE) performs a similarity search and returns a result set for each quicklink query. A separate result set is returned for each searched attribute of the initial database object. Each result set comprises zero or more database objects, and hence takes the form of zero or more hierarchical documents. Each result set also includes the relationship between the returned database objects and the initial database object. In accordance with step 106, the SSE feeds the hierarchical documents of each result set to a visualization model. The visualization model holds the model edges and the model nodes and allows the system to maintain those properties. The visualization model interface allows a view of the visualization model to be created and displayed to the user.

In accordance with step 108, each hierarchical document becomes a Model Node. A Model Node is an entity in a visualization model that relates to a document stored in a hierarchical format. A Model Node is actually a visual representation of a hierarchical document and includes properties that tie it to a hierarchical document and determine how the node should be displayed. In accordance with step 107, the SSE feeds the result set for each quicklink query to the visualization model. In accordance with step 109, each relationship between the returned database object(s) and the initial database objects becomes a Model Edge. A Model Edge is an entity in a visualization model that relates to a connection between two documents stored in a hierarchical format. A Model Edge has properties for 'From Nodes' and 'To Nodes' (i.e. Documents). In addition, a Model Edge has a query list that allows the user to add query attributes that link the two documents/nodes together. In accordance with step 110, the Model Nodes are displayed as entities in a visual representation of related database objects, and the Model Nodes are connected by the Model Edges, which visually illustrate the relationships among the various Model Nodes.

Figure 2:
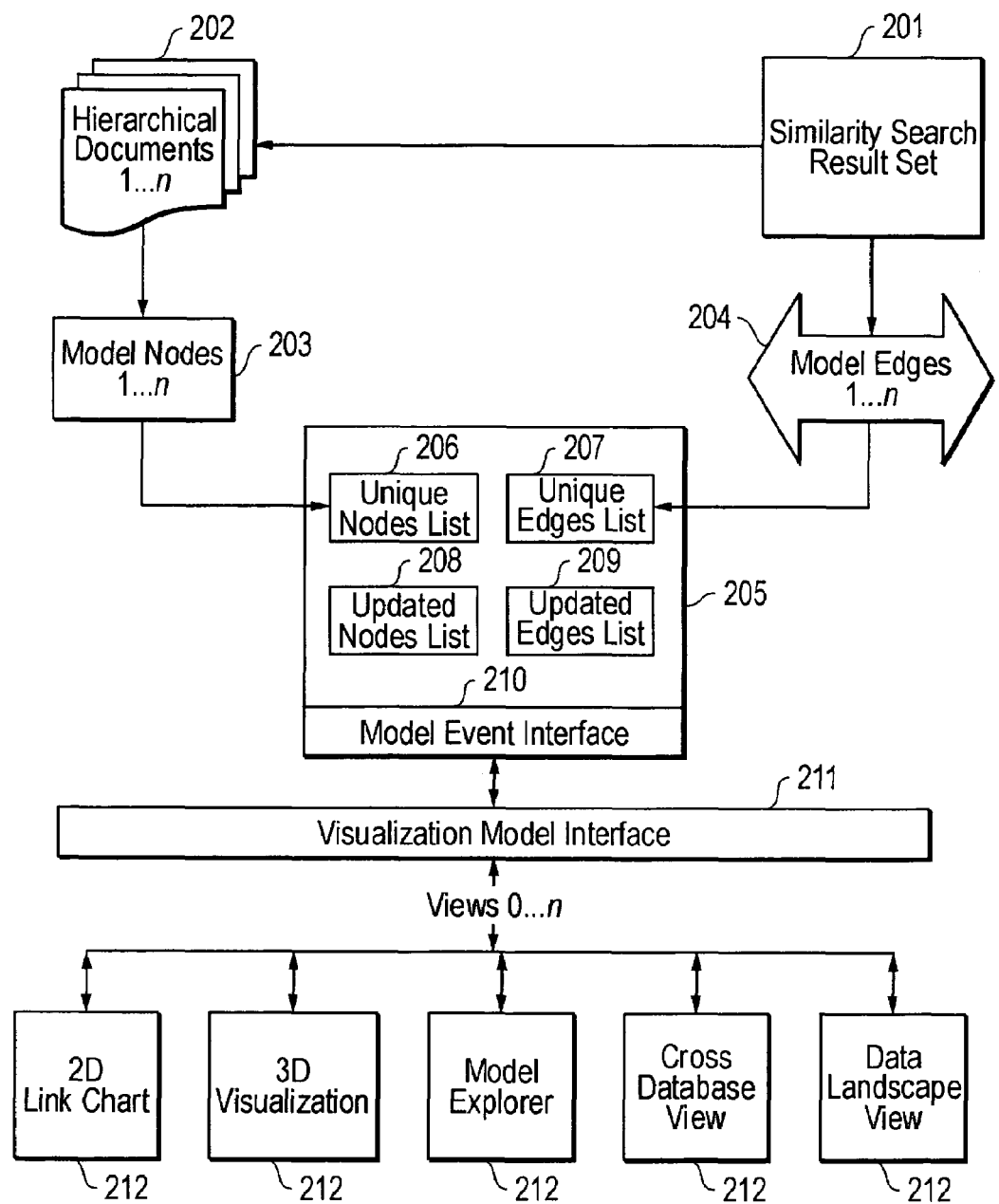
FIG. 2 is a flowchart illustrating an overview of the visualization model of the current invention.

To display hierarchical database data in visual form, a visualization model is needed. FIG. 2 is a diagram that illustrates an overview of a visualization modeling process, in accordance with the present invention. A similarity search returns a set of results 201. The result set 201 takes the form of hierarchical documents 1 . . . n 202. Each hierarchical document 202 becomes a Model Node 203, an entity that can be displayed in the visual structure that is created during the visualization modeling process. Each Model Node 203 corresponds to a separate hierarchical document 202 and contains properties that support the visual rendering of the hierarchical document 202.

When a Model Node 204 is created, a lookup is performed on a Unique Nodes List 206 of the visualization model 205, to determine whether the node already exists. If the node does not exist, the Model Node 203 is added to the Unique Nodes List 206 in a view model 205. The view model 205 holds Model Nodes and the Model Edges. All nodes maintained by the view model 205 are held in the Unique Nodes List 206, such that only one Model Node representation of each hierarchical document 202 is stored.

When visualizing data contained within hierarchical documents, it is paramount that the user can determine the relationships that a document holds to other documents in the system. Thus, the similarity searching result set also produces one or more Model Edges 204, which correspond to the relationships among the hierarchical documents 202 that were returned from the similarity search result set 201. These Model Edges 204 are used to connect the Model Nodes 203 that are displayed within the visual structure. The visual structure that will result from the Model Nodes 203 being connected to each other by the Model Edges 204 will illustrate the relationships among the separate hierarchical documents 202. This allows the user to visually follow a 'similarity' paper trail of documents in the system. The Model Edges 204 are added to a Unique Edges List 207 in the view model 205.

The view model 205 maintains properties for all listed unique nodes and edges, and updated nodes and edges, and it provides a Model Event Interface 210 that r communicates with a Visualization Model Interface 211. The Visualization Model Interface 211 creates views of the model. The Model Event Interface 210 and Visualization Model Interface 211 facilitate rendering the visual model in many different views 212, such as 2-Dimensional, 3-Dimensional, Model Explorer, Cross Database View, Data Landscape View, and other suitable forms for viewing data and its interrelationships visually. The Visualization Model Interface 211 allows all supported views 212 to refresh their individual display structures, through the visualization model interface, in the manner best suited to each individual view 212. The Model Event Interface 210 and the Visualization Model Interface 211 use both the unique nodes list and the unique edges lists to achieve this. When a Model Node 203 or a Model Edge 204 is created, updated, changed, or deleted it is added to the Updated Nodes List 208 or the Model Edges List 209, respectively. A message is then communicated via the Visualization Model Interface 211 that the visualization model 205 has been changed, and each view 212 is then updated according to the Updated Nodes List 208 and the Updated Edges List 209.

Figure 3:
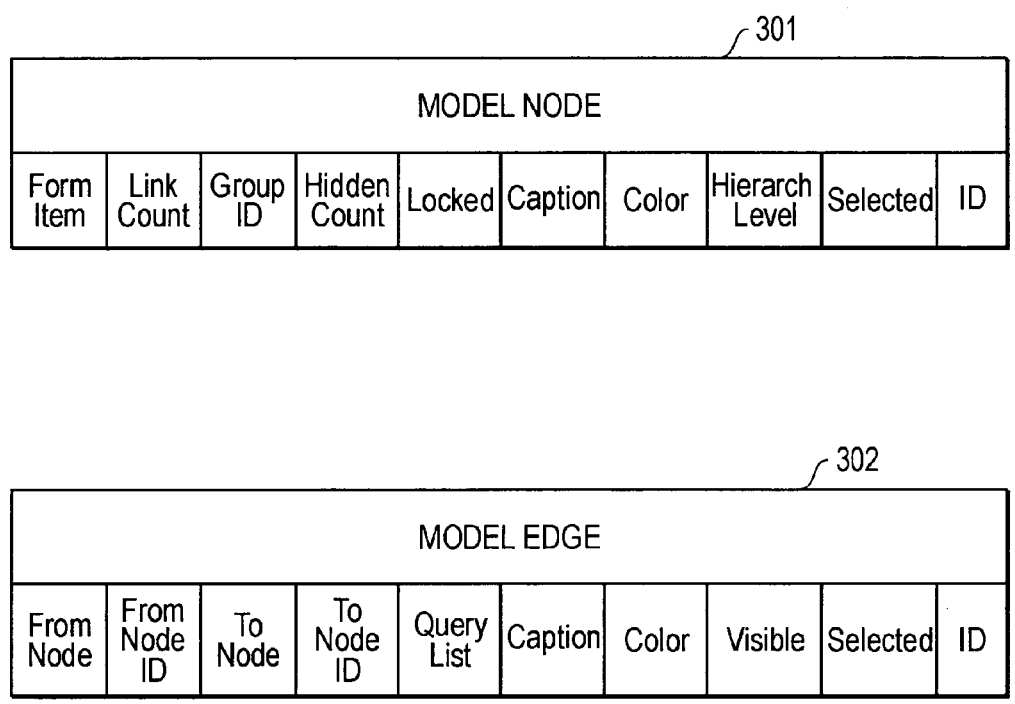
FIG. 3 is a diagram displaying a detailed properties and architecture of the model nodes and edges of the current invention.

FIG. 3 illustrates the properties contained in Model Node architecture 301 and the properties contained in Model Edge architecture 302, in accordance with the present invention. The properties contained by the Model Node 301 and Model Edge 302 also include properties that provide for the visual display of the Model Node. The properties contained in the Model Node architecture 301 include a property, shown as "Form Item," which identifies the hierarchical document which the Model Node visually represents. The Form Item essentially acts as a pointer to the hierarchical document represented by the Model Node and includes the primary key of the hierarchical document, a document A summary and an internal representation of the document schema. The Link Count identifies how many Model Edges are connected to this Model Node. The Hidden Count identifies how many of the Model Edges associated with this Model Node are hidden for display purposes. Locked identifies whether a node can be hidden from display. Color identifies the display color. Selected identifies the Model Node selected for processing. ID is the unique Model Node identifier. Hierarchical Level identifies the position of the object represented by the Model Node, within the hierarchy of objects displayed by the visualization model.

The Model Edge architecture 302 contains properties that provide for the visual representation of relationships that exist among the hierarchical database objects that are shown as the Model Nodes. The properties contained in the Model Edge architecture 302 include properties that identify at least one Model Node from which the Model Edge will extend and at least Model Node to which it will extend. These Model Nodes may be identified generally, as "From Node" and "To Node." The From Node is a pointer to the starting node while the From Node ID is the identifier of the starting node. The To Node is a pointer to the receiving end node while the To Node ID is an identifier of the node. The properties contained in the Model Edge architecture 302 also include a "Query List." The Query List stores query criteria used by the visualization model to establish the relationships that are visually represented by the Model Edge. Caption includes any caption that is displayed along with the hierarchical object that is visually represented by the Model Node. Likewise, Color identifies the displayed color of the Model Edge. The properties contained by the Model Node architecture 301 may also include an identifier, shown as "ID," in order to provide consistent reference to the particular Model Node throughout the visualization model. Visible determines whether the Model Edges is currently visible. Selected identifies the Model Edge selected for processing. ID is the unique Model Edge identifier.

Figure 4:
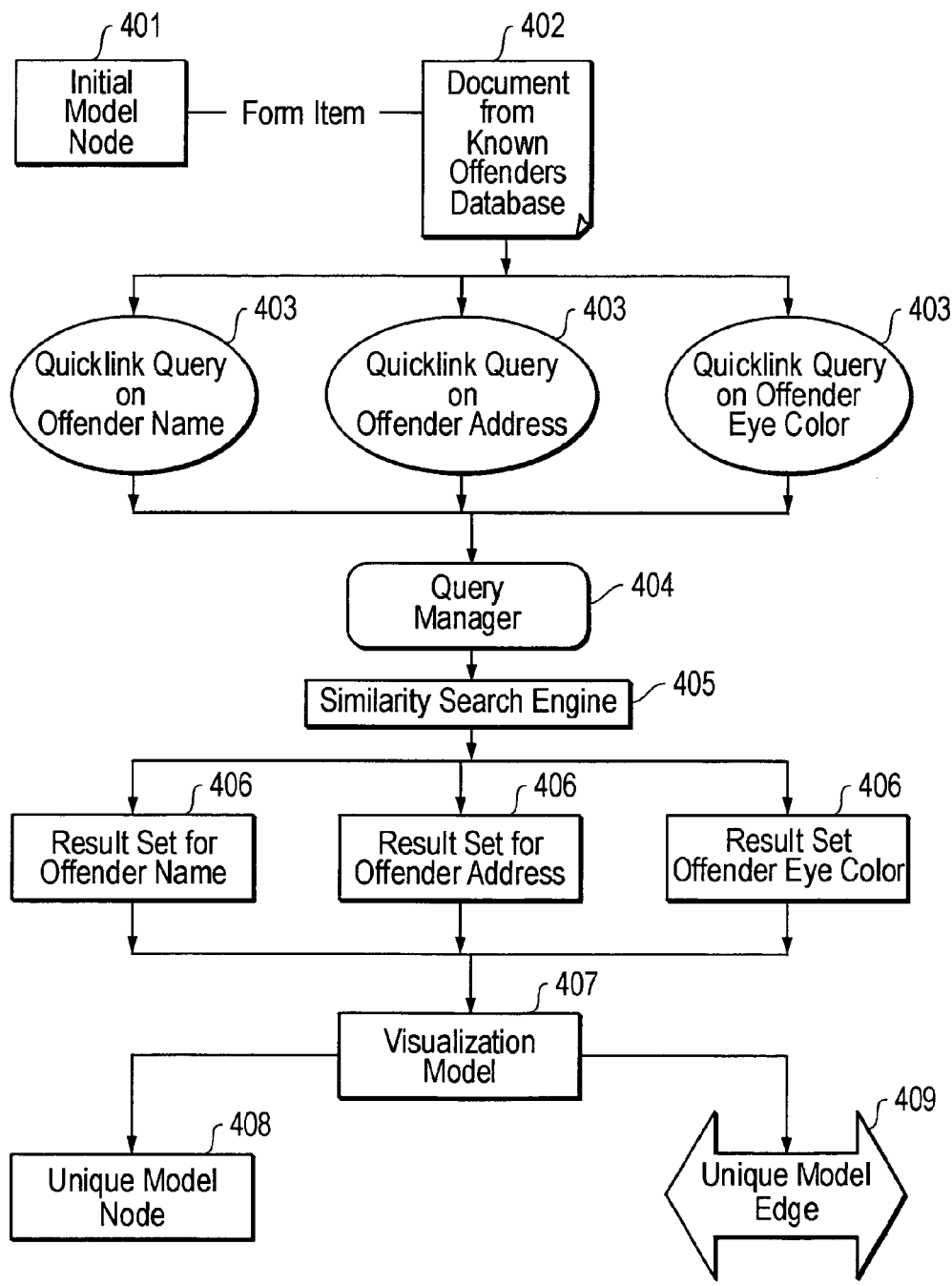
FIG. 4 is a flowchart displaying the process of visualizing quicklinks for a model node contained in the visualization model of the current invention.

FIG. 4 is a flowchart of the quicklink query process, in which each visualization Model Node is created from a hierarchical document, as described with reference to FIGS. 1 and 2. FIG. 4 utilizes an example application of the current invention, a document from a database of known offenders, in order to display its method. A user views a visual representation of at least one database object, including the initial Model Node 401. The initial Model Node 401 contains in its properties a Form Item, as described with reference to FIG. 3. The Form Item corresponds to the hierarchical document 402 that the initial Model Node 401 visually illustrates. The hierarchical document 402 contains at least one quicklinkable attribute, or field. The user devises separate quicklink queries 403 for each quicklinkable attribute of the hierarchical document 402 that the user wishes to search. The user submits these quicklink queries 403 to a query manager 404. The query manager 404 then submits, to a similarity search engine (SSE) 405, separate search commands that correspond to each quicklink query. The similarity search engine 405 may comprise any search engine suitable for searching a hierarchical database system and returning at least one set of results in the form of related hierarchical documents. The search engine may be of the type specified in the U.S. patent application Ser. No. 09/401, 101, titled "System and Method for Performing Similarity Searching," filed on Sep. 22, 1999.

Separate result sets 406 are returned by the similarity search engine 405 for each quicklink query 403 that was submitted to the query manager 404. Thus, a separate result set 406 is returned that corresponds to each quicklinkable field of the hierarchical document 402 that was searched by the user. Each result set 406 contains an anchor document, the query criteria, and the target documents that were returned by the similarity search engine 405. Each result set 406 is added to the visualization model 407. Each result set 406 is interpreted by the visualization model 407, and a Unique Model Node 408 is created for every document contained in the result set. The visualization then attempts to add each Unique Model Node to the Unique Nodes List, described with reference to FIG. 2. A Unique Model Node 408 is added to the Unique Nodes List, if a matching node does not already exist.

The visualization model 407 then creates Model Edges by establishing relationships between the anchor document of each result set 406 and each target document returned in the result set 406. For each anchor document/target document relationship, a Unique Model Edge 409 is created. The Unique Model Edge 409 stores the relationship of a unique link between the target and anchor documents, in addition to the query criteria that created the link. For each Unique Model Edge 409 that is created between anchor and target documents, the query criteria are added to the query list property of the Unique Model Edge 409, described with reference to FIG. 3. The Unique Model Edge 409 is then added to the Unique Edges List, described with reference to FIG. 2, if a matching Model Edge does not already exist. If a matching Model Edge already exists between two documents, then the query attributes that created the more recent Model Edge are simply added to the existing Model Edge's query list.

FIG. 5 is an illustration of an example graphical user interface (GUI) 500 that may be used in implementing the current invention. The GUI 500 allows a user to edit settings and quicklinkable field parameters A first area 501 of the GUI 500 allows the user to select the database object field for within the hierarchical database schema shown in 501 for which the settings will be edited. Selection may be made using any suitable means for selecting an entity within a GUI, such as marking checkboxes or highlighting the entities.

Upon the user's selecting an object field, a second area 502 of the GUI 500 allows the user to display and edit settings with regard to the field that the user selected. The user may select aspects of the visual representation, to which the edited settings will apply, by selecting an Editor mode. For instance, the user may desire certain settings to apply to text that is shown in the visual representation and other settings to apply to Model Nodes or Model Edges. The user may then change the Editor mode to "Text," etc., as needed.

The settings that a user may edit include Display Settings, such as the colors imparted to various aspects of the visual display and whether certain aspects are made visible. The settings may also include General Settings, such as data types and descriptions and field names. The General Settings may also include selectable functions that affect the manipulation of data, such as whether the data represents a key by which the data is linked to other data; whether the data should be read-only; whether the data is should be required to execute a quicklink search; and whether a summary of results should be shown to the user.

The user may also edit Quicklink Settings, functions that affect the use of quicklinks in conjunction with searches performed by the SSE. The user may select whether to allow quicklink queries to be developed for the field and the user may select to enter a separate GUI for editing context mapping parameters, described with reference to FIG. 6 below. For each quicklinkable field, the user also may specify a threshold weight that will be used to define the similarities of fields in other database objects. For example, if the weight is set at 99%, any document that contains a field that is 99% similar is returned as in the similarity search result set.

Finally, the user may use the second area 502 of the GUI 500 to edit SSE settings for the similarity search engine (SSE). The user may here set defaults that will be applied in the quicklink search, failing the specification of parameters in the Quicklink Settings described above. Default measures, default weighting and use of a tokenizer may be set, and the user may select to enter a separate GUI for editing context mapping parameters, described with reference to FIG. 6 below.

FIG. 6 shows a graphical user interface (GUI) 600 that allows users to define context mapping parameters for the selected field. Context mapping allows the user to specify other fields within the database objects that the selected field will quicklink to. The user may specify any field in any database within the hierarchical database management system (HDBMS) to which the invented method is applied. A HDBMS may contain many separate hierarchical database schemae. Thus, the context mapping may be inter-schema or intra-schema. The GUI 600 shows a first area 601, in which various databases are listed. The user selects a database that contains objects that the user wishes to search. For example, the user may select the database shown as "DB__3." However, the user may not wish to search all fields of the objects in DB__3. Thus, the user may use a second area 602 of the GUI 600 for selecting the fields to which an edited field may be quicklinked. Thus, if the field being edited by the user, as described with reference to FIG. 5, is "First Name," then the user may select only to search through the "First Name" fields of the objects in Test_DB__500 K. Thus, the user would select DB__3/Name-Standard/First Name. Selection may be made using any suitable means for selecting an entity within a GUI, such as marking checkboxes or highlighting the entities.

FIG. 7 shows a graphical user interface (GUI) 700 for allowing a user to specify a quicklink query. The user can run the quicklink query on the entire Model Node or select fields within the Model Node on which to run the query as shown in FIG. 8.

Figures 8, 9:
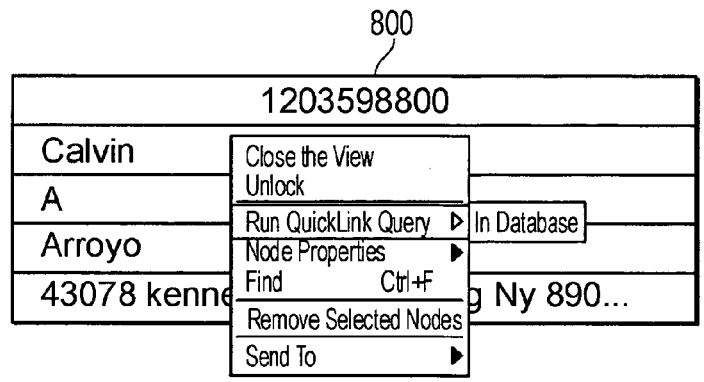
FIG. 8 shows a graphical user interface for allowing a user to run a quicklink query on selected model nodes.
FIG. 9 shows a graphical user interface for allowing a user to specify the linkable a fields on which a quicklink query is to be run.

FIG. 8 shows a graphical user interface (GUI) 800 for allowing a user to run a quicklink query on selected nodes.

FIG. 9 shows a graphical user interface (GUI) 900 for allowing a user to specify the quicklinkable fields within one or more databases on which a query is to be run.

Figure 10:
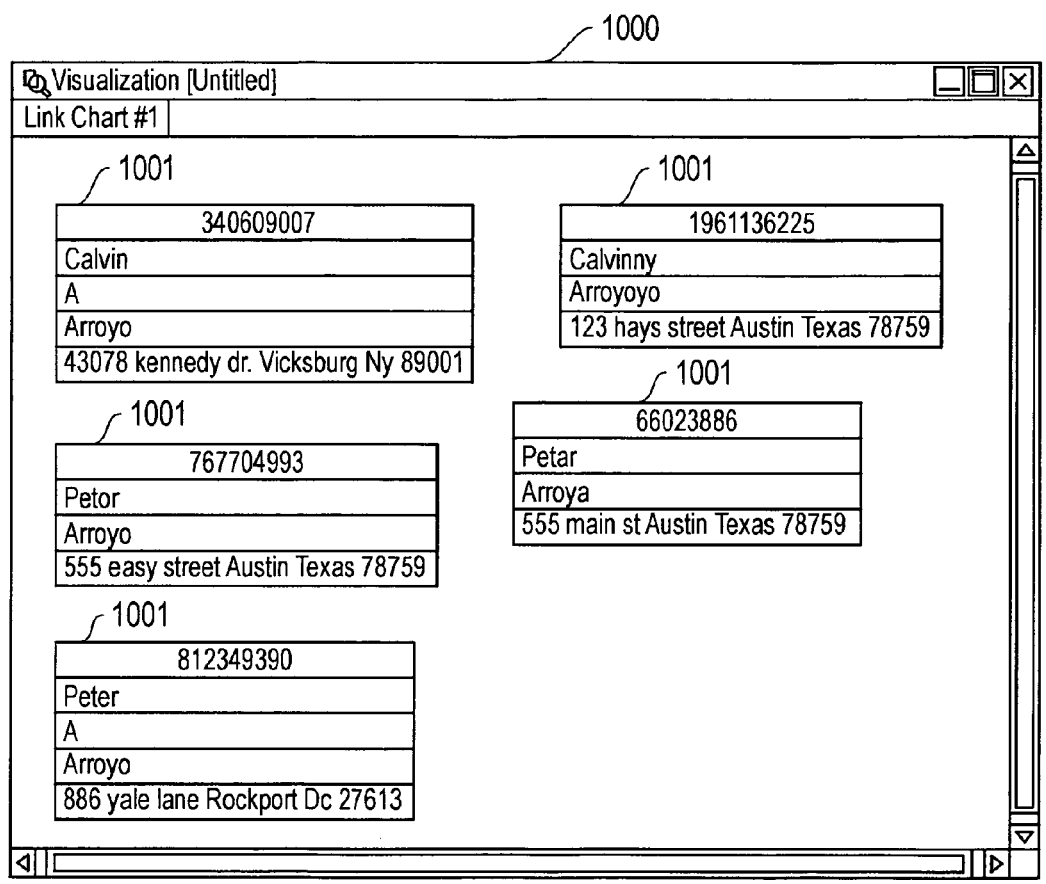
FIG. 10 shows the visualization model node objects displayed in visual two-dimensional hierarchical database objects.

FIG. 10 shows a graphical user interface (GUI) 1000 that displays hierarchical database objects as two-dimensional visualization Model Nodes 1001. The two-dimensional visualization hierarchical database objects act as a conduit between a hierarchical database and a visualization model by providing the user with a visual representation of hierarchical data objects. Users may then select visual objects, the Model Nodes 1001, and run a quicklink query search on them. As yet, there are no Mode Edges displayed, because no similarity relationships have been established among the Model Nodes 1001.

Figure 11:
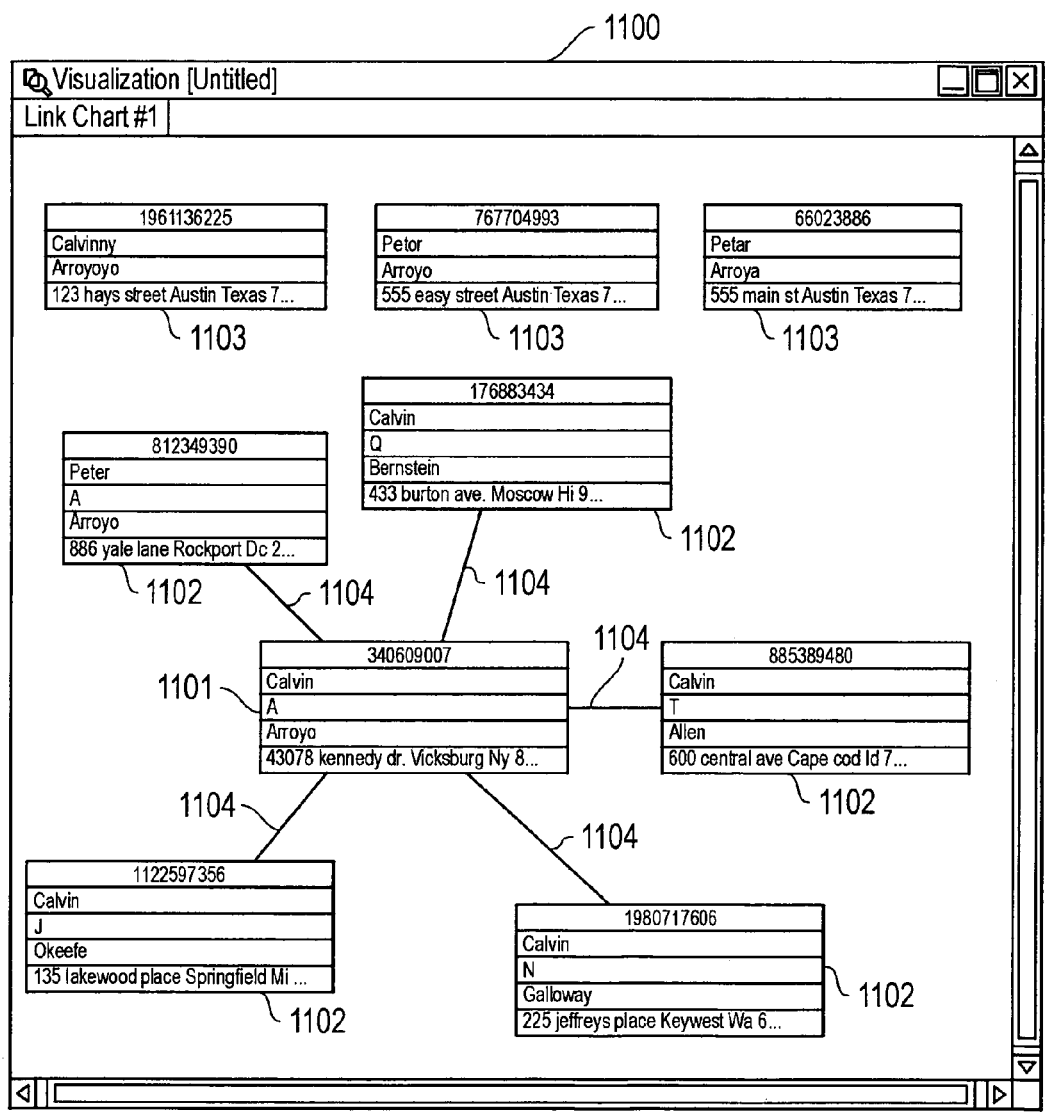
FIG. 11 shows a representation of the two-dimensional visualization of the quicklink query results.

FIG. 11 shows a graphical user interface (GUI) 1100 that displays hierarchical database objects as two-dimensional visualization Model Nodes 1101, 1102, and 1103, and displays the relationships among them as Model Edges 1104. This two-dimensional rendering of Model Nodes 1101, 1102, and 1103, and Model Edges 1104 acts as one of the views supported by the visualization model, as described with reference to FIG. 2. The visualization model is the result of a user selecting the visualization Model Nodes described with reference to FIG. 10 and running a quicklink query search on them. The results of the search display some Model Nodes that were not represented among those selected by the user.

Each Model Node 1101, 1102, and 1103 in the visualization model is rendered as a geometric shape. The shape is presented in a color that is pre-assigned to the database, in which the object represented by the Model Node 1101, 1102, and 1103 is stored. Each Model Edge 1104 in the visualization model is rendered as a line between two Model Nodes. Each Model Edge 1104 represents a similarity relationship between the database objects that are represented by two Model Nodes.

A center Model Node 1101 represents the quicklink anchor document, described with reference to FIG. 4. The surrounding Model Nodes 1102 represent the target documents that have been found to be similarly related to the anchor document. The Model Edges 1104 connect the center Model Node 1101 to the surrounding Model Nodes 1102, thereby showing which documents are related to the anchor document represented by the center Model Node 1101. The unjoined Model Nodes 1103 represent documents that are not sufficiently similar to the anchor document, as defined by the threshold set by the user in the GUI described with reference to FIG. 5. Thus, no Model Edges connect them to the center Model node 1101.

Figure 12:
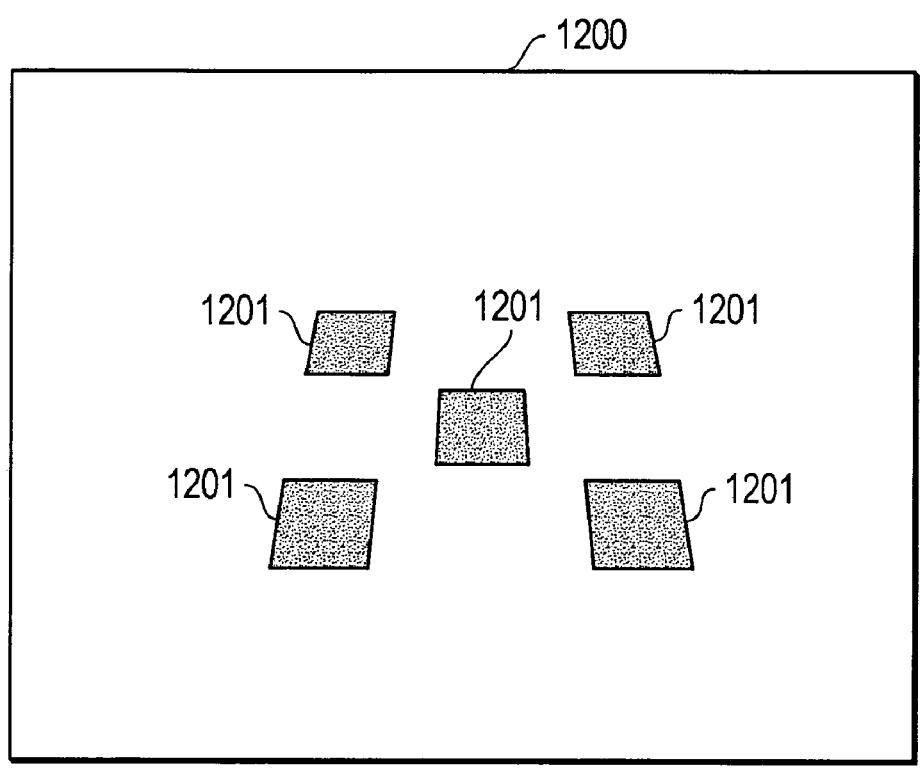
FIG. 12 shows the visualization model node objects displayed in three-dimensional hierarchical database object visualization.

FIG. 12 shows an illustration 1200 of hierarchical documents as three-dimensional Model Nodes 1201. The three-dimensional visualization hierarchical database objects act as a conduit between a hierarchical database and a visualization model, by providing the user with a visual representation of hierarchical data objects. Users may then select visual objects, the Model Nodes 1201, and run a quicklink query search on them. As yet, there are no Mode Edges displayed, because no similarity relationships have been established among the Model Nodes 1201.

Figure 13:
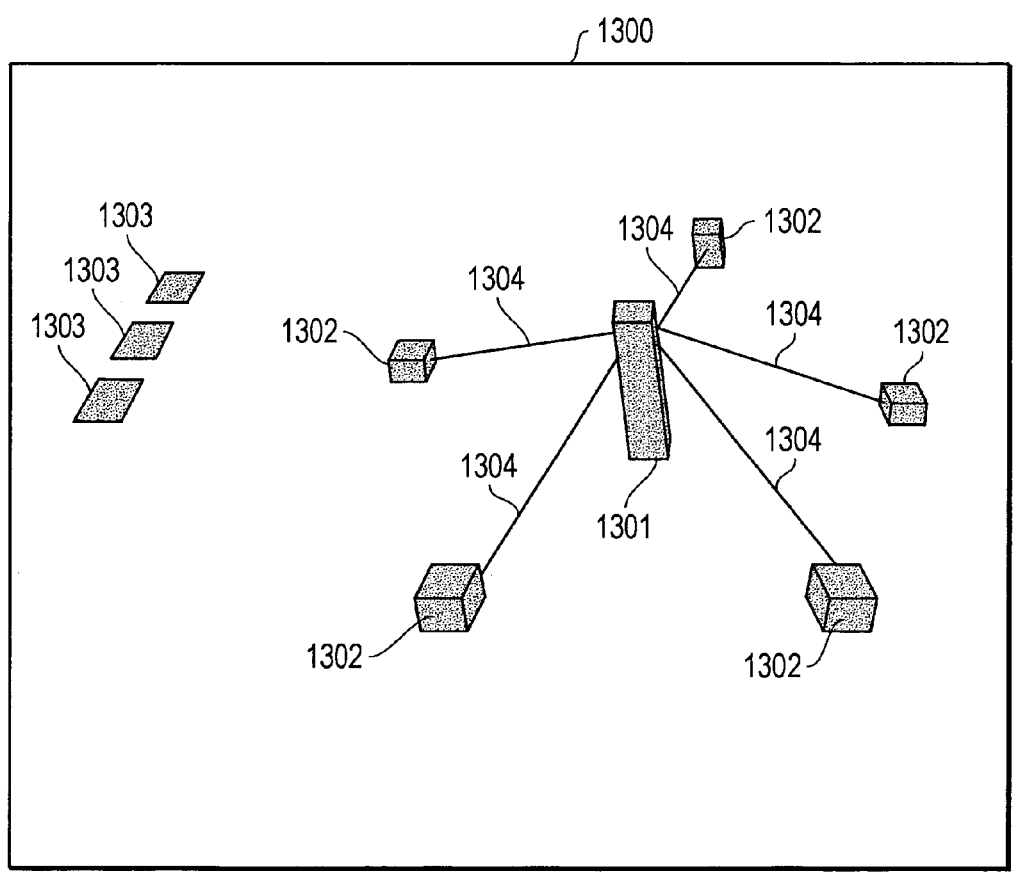
FIG. 13 shows the visualization model node and edge objects displayed in three-dimensional hierarchical database object visualization.

FIG. 13 shows an illustration 1300 of hierarchical documents as three-dimensional Model Nodes 1301, 1302, and 1303, and displays the relationships among them as Model Edges 1304. This three-dimensional rendering of Model Nodes 1301, 1302, and 1303, and Model Edges 1304 acts as one of the views supported by the visualization model, as described with reference to FIG. 2. The three-dimensional hierarchical database object visualization acts as a conduit between a hierarchical database and a visualization model, by providing the user with a visual representation of hierarchical data objects and the similarity relationships among them. The visualization model is the result of a user selecting the visualization Model Nodes described with reference to FIG. 12 and running a quicklink query search on them. The results of the search display some Model Nodes that were not represented among those selected by the user.

Each Model Node 1301, 1302, and 1303, in the visualization model is rendered as a geometric shape. The shape is presented in a color that is pre-assigned to the database, in which the object represented by the Model Node 1301, 1302, and 1303, is stored. Each Model Edge 1304 in the visualization model is rendered as a line between two Model Nodes. Each Model Edge 1304 represents a similarity relationship between the database objects that are represented by two Model Nodes.

A center Model Node 1301 represents the quicklink anchor document, described with reference to FIG. 4. The surrounding Model Nodes 1302 represent the target documents that have been found to be similarly related to the anchor document. The Model Edges 1304 connect the center Model Node 1301 to the surrounding Model Nodes 1302, thereby showing which documents are related to the anchor document represented by the center Model Node 1301. The unjoined Model Nodes 1303 represent documents that are not sufficiently similar to the anchor document, as defined by the threshold set by the user in the GUI described with reference to FIG. 5. Thus, no Model Edges connect them to the center Model node 1301.

In the embodiment shown in FIG. 11, the Model Nodes 1301, 1302, and 1303, are represented as square blocks of varying heights. The height of each Model Node 1301, 1302, and 1303, is determined by the number of links between the Model Node and another Model Node. When a link is made from a Model Node to another Model Node, the height of each is increased by one unit. The user may set the measure of a unit of height. In the embodiment shown in FIG. 11, a Model Node that is one unit high becomes a cube. For instance, since no links have been made from or to the unjoined Model Nodes 1303, they each have a height of zero (0). Since each of the five surrounding Model Nodes 1302 are linked to the center block 1301, each surrounding Model Node 1302 is one unit high, and the center Model Node 1302 is five units high.

Figure 14:
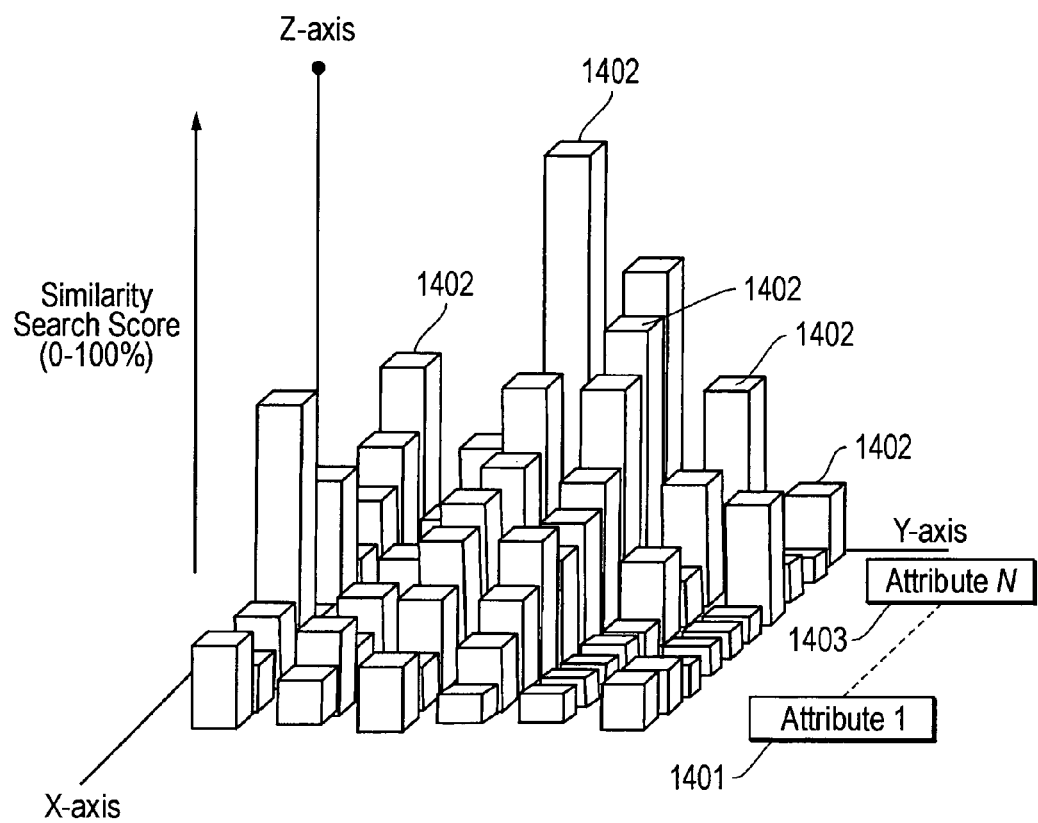
FIG. 14 is a display of the three-dimensional (3D) result set visualization of a similarity search result set.

FIG. 14 displays a similarity search result set in three-dimensions. The visual representation enables a user to simultaneously inspect many hierarchical objects that are included in the similarity search result set. The user may also inspect the degree of similarity between the search 'anchor' object and each of the 'target' cases that have been included in the result set, with reference to each attribute or field searched. The attributes, or fields, that were used to form the search criteria are aligned along the X-axis. The attributes are placed in order by the structure of the database schema being visually represented. For example, if FIG. 14 represented a database schema whose attributes were arranged in order from "Name" to "Eye Color," then Attribute 1 1401 in FIG. 14 would be "Name," and Attribute N 1403 would be "Eye Color." Model Nodes 1402 are placed along slices of the Y-axis. In the embodiment shown in FIG. 14, the Model Nodes 1402 comprise similarity search score 'blocks.' A row of Model Nodes 1402, viewed from front to back in FIG. 14, denotes a single target document: a hierarchical database object that is contained in a similarity search result set. A Model Node 1402 corresponding to an attribute of the hierarchical document is displayed at each X-Y intersection in the row.

A Z-axis represents similarity search score, with similarity increasing as one moves up the Z-axis. In the embodiment shown in FIG. 14, the terminus at the top of the Z-axis represents 100% similarity between the attribute of a target document and the same attribute in the anchor document. The Z-axis may be made to run from 0–+100%, or from −100%–+100%. Where similarities are not absolute, a user may elect to have the Z-axis run from 0–+∞, or from −∞ to +∞. The degrees of similarities represented by the Model Nodes 1402 are calculated relative to one another, and the heights of the blocks along the Z-axis are set proportionally in the visual representation.

A 2D value based visualization is the ability to visually display similarity relationships in a hierarchical database. Each rectangle, or other geometric shape, would denote a particular value that is stored in a hierarchical database object, such as a phone number. A line between any two geometric shapes would denote a similarity relationship link through a hierarchical database object. The visual relationship can be stated as, "Phone Number 305-0257 has a similarity relationship to Phone Number 305-0250 in claim Numbers 1, 2 and 3".

In addition to the features described in 2D value-based visualization, the 3D value based visualization renders the picture in three dimensions. For every geometric shape contained in a chart, a geometric node block is rendered where the height of the block is determined by the number of edges, or lines, that connect to the object. In addition, each height unit of the block can be rendered in a different color, depending on the database from which links the two values together. Every edge, or link, is rendered in the same fashion as 2D value-based visualization.

Figure 15:
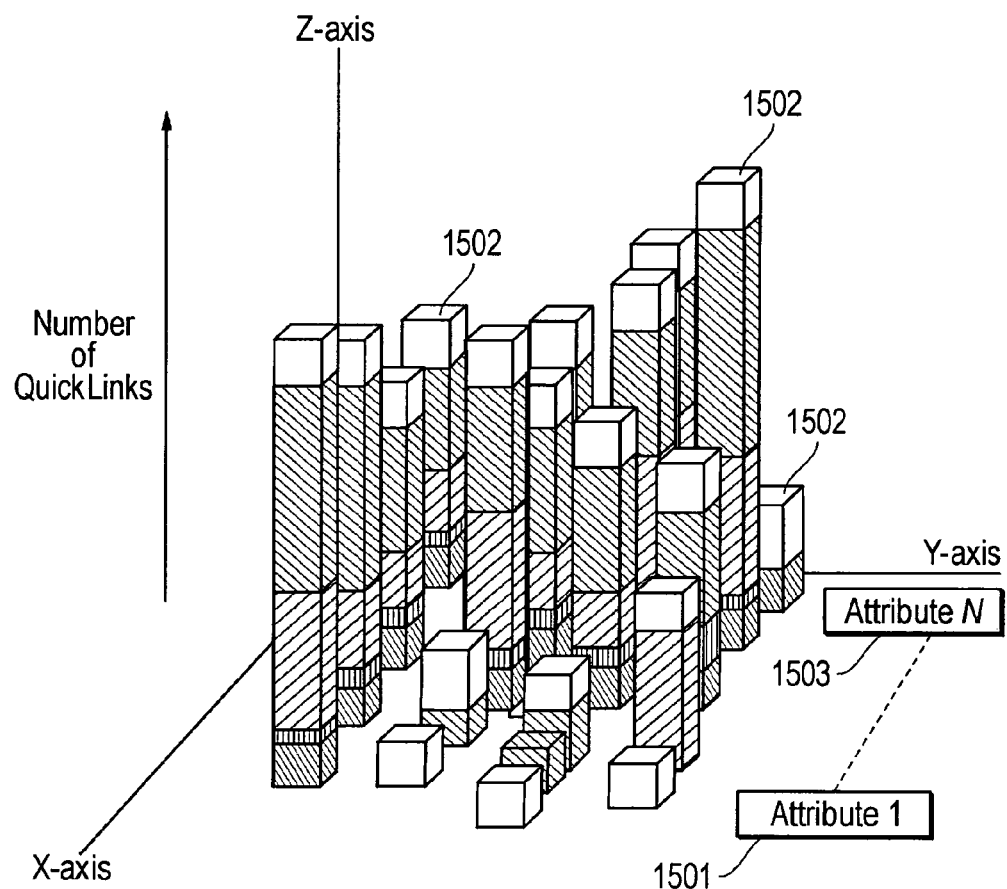
FIG. 15 shows a total similarity links starting point layout.

FIG. 15 shows a second embodiment of a method for displaying a similarity search result set in three-dimensions. This embodiment also allows the user to peruse a large amount of data, in order to discover similarity trends and anomalies in the objects of a hierarchical database. The visual representation enables a user to simultaneously inspect many hierarchical objects that are included in the similarity search result set. The user may also inspect the degree of similarity between the search 'anchor' object and each of the 'target' cases that have been included in the result set, with reference to each attribute or field searched. The attributes, or fields, that were used to form the search criteria are aligned along the X-axis. The attributes are placed in order by the structure of the database schema being visually represented. For example, if FIG. 15 represented a database schema whose attributes were arranged in order from "Name" to "Eye Color," then Attribute 1 1501 in FIG. 14 would be "Name," and Attribute N 1503 would be "Eye Color." Model Nodes 1502 are placed along slices of the Y-axis. In the embodiment shown in FIG. 15, the Model Nodes 1502 comprise similarity search score 'blocks.' A row of Model Nodes 1502, viewed from front to back in FIG. 14, denotes a single target document: a hierarchical database object that is contained in a similarity search result set. A Model Node 1502 corresponding to an attribute of the hierarchical document is displayed at each X-Y intersection in the row.

A Z-axis represents similarity search score, with similarity increasing as one moves up the Z-axis. The Z-axis may be made to run from 0–+100%, or from −100%– +100%. Where similarities are not absolute, a user may elect to have the Z-axis run from 0–+∞, or from −∞ to +∞. The Z-axis may also be used to represent a less relative similarity for each attribute of the documents. In the embodiment shown in FIG. 15, for example, the Z-axis represents the number of quicklinks to each document for a given attribute. The height of each Model Node 1502 is determined by the number of edges, or lines, that connect to the object in a two-dimensional representation, such as that described with reference to FIG. 11; or in a three-dimensional representation, such as that shown in FIG. 13. The heights of the Model Nodes 1502 are set proportionally in the visual representation.

In the embodiment shown by FIG. 15, the manner of displaying the Model Nodes 1502 differs from the embodiment shown by FIG. 14. Each height unit of each Model Node 1502 is rendered in a different color represented in the figure by the variations in shading. The user is given the ability to view a number of hierarchical database objects and all of the similarity relationships for each attribute contained within the object. The user can select and define a schema criteria and similarity score tolerance. Every hierarchical database object may be displayed as a node stack where the different colors (here represented by shading) represent similarity counts for different items in the schema. The nodes stacks may be displayed on a three dimensional grid in a format that can be ordered by the user based on criteria that may be selected by the user.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e., an article of manufacture, according to the invention. The computer readable media may be, for instance, a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention.

What is claimed is:

1. A computer-implemented visualization model of similarity relationships between documents comprising:
 performing a similarity search in a database based on at least one reference attribute of at least one reference document to find at least one target document with at least one target attribute having a similarity relationship to the at least one reference attribute;
 creating unique visualization model nodes corresponding to the at least one reference document and the at least one target document;

assigning properties to the unique visualization model nodes including form item, link count, group ID, hidden count, locked, caption, color, hierarchical level, selected and ID;

creating unique visualization model edges corresponding to the similarity relationships between the at least one reference document and the at least one target document;

assigning properties to the unique visualization model edges including from node, from node ID, to node, to node ID, query list, caption, color, visible, selected and ID;

displaying the unique visualization model nodes and the unique visualization model edges on a graphical user interface; and indicating a degree of similarity between the displayed unique visualization model nodes by the displayed unique visualization model edges.

2. The method according to claim 1 wherein the at least one target document that is similarity searched reside in a plurality of databases.

3. The method according to claim 1 wherein the similarity search returns a result set of the at least one reference document, the at least one document, and similarity relationships between the at least one reference document and the at least one target document that are used by the visualization model to create the unique visualization model nodes corresponding to the documents and the unique visualization model edges corresponding to the similarity relationships between the documents.

4. The method of claim 1, wherein the visual representation is three dimensional.

5. The method of claim 1, wherein the visualization model is selected from the group consisting of a two dimensional link chart visualization, a three dimensional visualization, a model explorer visualization, a cross database visualization, and a data landscape visualization.

6. A computer-implemented interactive visualization model of similarity relationships between documents comprising:

using a similarity search performed on reference attributes of a reference document which-results in a set of 0 to n target documents with target attributes having similarity relationships with the reference attributes;

creating visualization model nodes corresponding to the reference document and each target document;

performing a lookup on a unique nodes list for determining if the created visualization model nodes already exists, adding the created visualization model nodes to the unique nodes list if the created visualization model nodes are not on the unique nodes list, and designating the visualization model nodes on the unique nodes list as unique visualization model nodes;

creating visualization model edges corresponding to the similarity relationships between the reference document and each target document;

performing a lookup on a unique edges list for determining if the created visualization model edges already exists, adding the created visualization model edges to the unique edges list if the created visualization model edges are not on the unique edges list, and designating the visualization model edges on the unique edges list as unique visualization model edges;

displaying the unique visualization model nodes corresponding to the reference documents and each target document and the unique visualization model edges corresponding to the similarity relationships on a graphical user interface; and indicating a degree of similarity between the displayed unique visualization model nodes by the displayed unique visualization model edges.

7. The method of claim 6 further comprising allowing a user using the graphical user interface to initiate the similarity search and select attributes of the reference document to be used in the similarity search.

8. The method of claim 6, further comprising allowing a user using the graphical user interface to choose any attributes of the reference document to be used in the similarity search.

9. The method of claim 8 further comprising using attributes of a target document as a source for a new search.

10. A computer-readable medium containing instructions for a computer-implemented interactive visualization model of similarity relationships between documents according to the steps of claim 6.

11. The method of claim 6, wherein the visualization model is selected from the group consisting of a two dimensional link chart visualization, a three dimensional visualization, a model explorer visualization, a cross database visualization, and a data landscape visualization.

12. A computer-implemented visualization model of similarities between documents comprising:

displaying a reference hierarchical object;

allowing a user to initiate a similarity search, based on at least one attribute of the reference hierarchical object, to find at least one target hierarchical object;

visually representing a unique visualization model reference node corresponding to the reference hierarchical object and a unique visualization model target node corresponding to the at least one target hierarchical object that meet a similarity search criteria;

visually representing a unique visualization model edge corresponding to a similarity relationship between the reference hierarchical object and each target hierarchical object;

displaying the visual representations of the unique visualization model nodes and the unique visualization model edge on a graphical user interface; and indicating a degree of similarity between the displayed unique visualization model nodes by the displayed unique visualization model edges.

13. The method according to claim 12 wherein the unique visualization model node comprises:

a reference to the hierarchical object the model node represents;

a reference to at least one attribute of the hierarchical object used in the similarity search to determine if a unique visualization model edge exists; and visual properties of the hierarchical document the unique visualization__model node represents.

14. The method according to claim 12 further comprising storing the visual representation of the unique visualization reference model node, each unique visualization target model node, and each unique visualization model edge in computer memory or on disk.

15. The method according to claim 12 wherein the unique visualization model edge comprises:

an identifier of the unique visualization reference model node from which the visual representation of the unique visualization model edge will extend and an identifier of the at least one unique visualization target model node to which the visual representation of the unique visualization model edge will extend; and a list of the similarity search attributes used in the similarity search.

16. The method according to claim 15 further comprising user chosen attributes to be used in the similarity search.

17. The method of claim 12, wherein each unique visualization model edge indicates a degree of similarity between the reference hierarchical object and the target hierarchical object and is displayed as a line connecting unique visualization model nodes, said model nodes being depicted as geometric shapes on the graphical user interface.

18. The method of claim 17, wherein the length of the line connecting the unique visualization model nodes varies as a function of the degree of similarity between the reference document and the target document referenced by the unique visualization model nodes.

19. The method of claim 12, wherein the visualization model is selected from the group consisting of a two dimensional link chart visualization, a three dimensional visualization, a model explorer visualization, a cross database visualization, and a data landscape visualization.

20. A computer-implemented method of visualizing similarity relationships between documents comprising:

using a reference hierarchical document; performing a similarity search based on user selected attributes of the reference hierarchical document and determining a result set of target documents comprising 0 to n hierarchical documents;

converting the reference hierarchical document and the 0 to n hierarchical documents to a unique visualization model nodes that visually represent the hierarchical documents to be displayed on a graphical user interface; using the similarity search results, creating a unique visualization model edges that visually represent the similarities between the reference hierarchical document and each similar hierarchical document in the result set to be displayed on a graphical user interface; and indicating a degree of similarity between the displayed unique visualization model nodes by the displayed unique visualization model edges.

21. The method of claim 20 further comprising displaying the unique visualization model edge and the unique visualization model node on a graphical user interface.

22. A computer-readable medium containing instructions for a computer-implemented method of visualizing relationships between documents according to the steps of claim 20.

23. The method of claim 20, wherein the visualization model is selected from the group consisting of a two dimensional link chart visualization, a three dimensional visualization, a model explorer visualization, a cross database visualization, and a data landscape visualization.

24. A computer-readable medium containing instructions for a visualization model of similarity relationships between documents comprising:

performing a similarity search in a database based on at least one reference attribute of a at least one reference document to find at least one target document with at least one target attribute having a similarity relationship to the at least one reference document;

creating unique visualization model nodes corresponding to the at least one reference document and the at least one target document;

assigning properties to the unique visualization model nodes including form item, link count, group ID, hidden count, locked, caption, color, hierarchical level, selected and ID;

creating unique visualization model edges corresponding to the similarity relationships between the at least one reference document and the at least one target document;

assigning properties to the unique visualization model edges including from node, from node ID, to node, to node ID, query list, caption, color, visible, selected and ID;

displaying the unique visualization model nodes and the unique visualization model edges on a graphical user interface; and indicating a degree of similarity between the displayed unique visualization model nodes by the displayed unique visualization model edges.

25. A computer-readable medium containing instructions for a visualization model of similarities between documents comprising:

displaying a reference hierarchical object;

allowing a user to initiate a similarity search, based on at least one attribute of the reference hierarchical object, to find at least one target hierarchical object;

visually representing a unique visualization model reference node corresponding to the reference hierarchical object and a unique visualization model target node corresponding to the at least one target hierarchical object that meet a similarity search criteria;

visually representing a unique visualization model edge corresponding to a similarity relationship between the reference hierarchical object and each target hierarchical object;

displaying the visual representations of the unique visualization model nodes and the unique visualization model edge on a graphical user interface; and indicating a degree of similarity between the displayed unique visualization model nodes by the displayed unique visualization model edges.

\* \* \* \* \*